(12) United States Patent
Ukai

(10) Patent No.: US 8,676,270 B2
(45) Date of Patent: Mar. 18, 2014

(54) DISPLAY APPARATUS, MOBILE COMMUNICATION TERMINAL AND DISPLAY SYSTEM

(75) Inventor: Hiroki Ukai, Nagoya (JP)

(73) Assignee: Denso Corporation, Kariya (JP)

(*) Notice: Subject to any disclaimer, the term of this patent is extended or adjusted under 35 U.S.C. 154(b) by 36 days.

(21) Appl. No.: 13/490,774

(22) Filed: Jun. 7, 2012

(65) Prior Publication Data

US 2012/0322507 A1    Dec. 20, 2012

(30) Foreign Application Priority Data

Jun. 16, 2011    (JP) ................................ 2011-134128

(51) Int. Cl.
 *H04W 88/02*    (2009.01)
(52) U.S. Cl.
 USPC ....................................... 455/566; 455/569.2
(58) Field of Classification Search
 USPC ........... 455/550.1, 566, 567, 575.1, 347, 351, 455/569.2, 345; 345/1.1, 2.1, 173; 715/748, 715/751, 761
 See application file for complete search history.

(56) References Cited

U.S. PATENT DOCUMENTS

| | | | |
|---|---|---|---|
| 5,596,721 A | 1/1997 | Masse et al. | |
| 7,834,819 B2 * | 11/2010 | Dunn et al. | 345/1.1 |
| 8,214,745 B2 * | 7/2012 | Chapman | 715/751 |
| 2003/0156097 A1 | 8/2003 | Kakihara et al. | |

FOREIGN PATENT DOCUMENTS

| | | |
|---|---|---|
| JP | 04-122140 | 4/1992 |
| JP | 2004-77324 | 3/2004 |
| JP | 2010-113728 | 5/2010 |
| JP | 2010-130670 | 6/2010 |

OTHER PUBLICATIONS

Office Action issued Jul. 23, 2013 in corresponding Japanese Application No. 2011-134128 (with English translation).

* cited by examiner

*Primary Examiner* — Thanh Le
(74) *Attorney, Agent, or Firm* — Harness, Dickey & Pierce, PLC

(57) ABSTRACT

A display apparatus capable of executing content of a mobile communication terminal in cooperation with the mobile communication terminal when the display apparatus is communicably connected to the mobile communication terminal is disclosed. The display apparatus comprises: an operation input device for inputting an operation on the content in the display apparatus; an acquisition device for acquiring input information, which indicates that the operation on the content has been inputted in the mobile communication terminal, from the mobile communication terminal; and a display device for showing that the operation on the content has been inputted in the mobile communication terminal when the acquisition device acquires the input information from the mobile communication terminal.

13 Claims, 13 Drawing Sheets

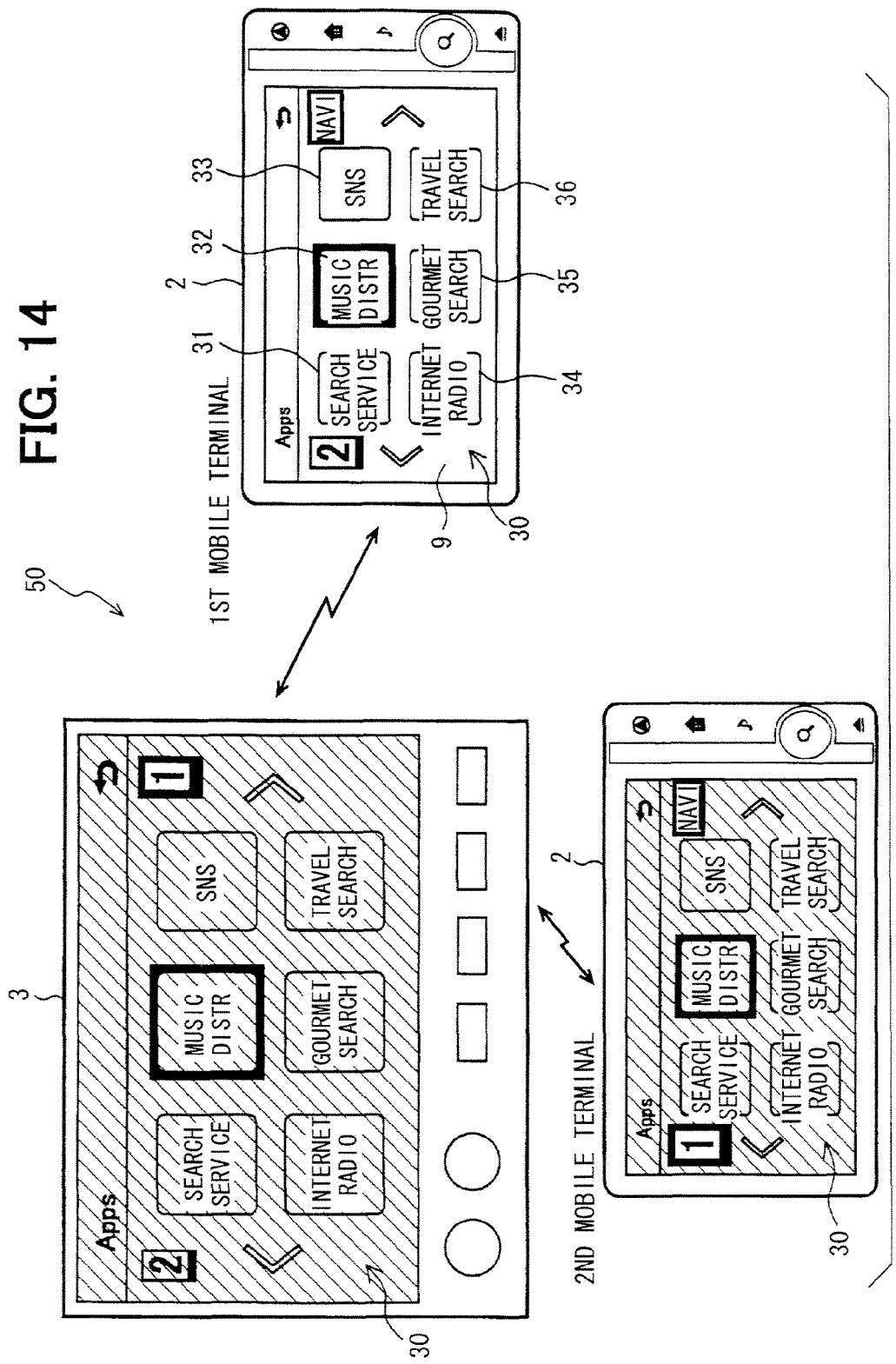

DISPLAY APPARATUS, MOBILE COMMUNICATION TERMINAL AND DISPLAY SYSTEM

CROSS REFERENCE TO RELATED APPLICATION

The present application is based on and claims priority to Japanese Patent Application No. 2011-134128 filed on Jun. 16, 2011, disclosure of which is incorporated herein by reference.

TECHNICAL FIELD

The present disclosure relates to a display apparatus, a mobile communication terminal and a display system.

BACKGROUND

In a known system, a mobile communication terminal and a display apparatus are communicably connected to each other so that an operation on content of the mobile communication terminal is inputtable from both of the mobile communication terminal and the display apparatus. For example, JP 2010-130670A1 discloses that a display apparatus mounted to a vehicle acquires information from a mobile communication terminal connected to the display apparatus and displays the acquired information on a display.

In this relation, the inventor of the present application has found out the following. When the operation on the content is inputtable from both of the mobile communication terminal and the display apparatus, different users can operate the content by using the mobile communication terminal and the display apparatus. Since the operation with use of the mobile communication terminal or the display apparatus leads to the same change in the display of the two apparatuses, it becomes difficult to grasp which of the two apparatuses has been used to input the operation.

SUMMARY

The present disclosure is made in view of the foregoing. It is an object of the present disclosure to provide a display apparatus, a mobile communication terminal and a display system that makes it possible to keep track of whether the mobile communication terminal or the display apparatus has been used to input an operate on content.

According to a first example of the present disclosure, there is provided a display apparatus that is capable of executing content of a mobile communication terminal in cooperation with the mobile communication terminal when the display apparatus is communicably connected to the mobile communication terminal. The communication terminal is also capable of executing the content of the mobile communication terminal. The display apparatus comprises: an operation input device for inputting an operation on the content in the display apparatus; an acquisition device for acquiring input information, which indicates that the operation on the content has been inputted in the mobile communication terminal, from the mobile communication terminal; and a display device for showing that the operation on the content has been inputted in the mobile communication terminal when the acquisition device acquires the input information from the mobile communication terminal.

According to a second example of the present disclosure, there is provided a mobile communication terminal that is capable of executing content of the mobile communication terminal in cooperation with a display apparatus when the mobile communication terminal is communicably connected to the display apparatus. The display apparatus is also capable of executing the content of the mobile communication terminal. The mobile communication terminal comprises: an operation input device for inputting an operation on the content in the mobile communication terminal; an acquisition device for acquiring input information, which indicates that the operation on the content has been inputted in the display apparatus, from the display apparatus; and a display device for showing that the operation on the content has been inputted in the display apparatus when the acquisition device acquires the input information from the display apparatus.

According to a third example of the present disclosure, a display system comprises a mobile communication terminal and a display apparatus communicably connectable to each other. Each of the mobile communication terminal and the display apparatus comprises an operation input device, a notification device, and a display device. The operation input device of the display apparatus is provided to input an operation on content in the display apparatus. The operation input device of the mobile communication terminal is provided to input the operation on the content in the mobile communication terminal. By acquiring input information from the mobile communication terminal, the acquisition device of the display apparatus is notified that the operation on the content has been inputted in the mobile communication terminal. When the acquisition device of the display apparatus is notified that the operation on the content has been inputted in the mobile communication terminal, the display device of the display apparatus shows that the operation on the content has been inputted in the mobile communication terminal. By acquiring the input information from the display apparatus, the acquisition device of the mobile communication terminal is notified that the operation on the content has been inputted in the display apparatus. When the acquisition device of the mobile communication terminal is notified that the operation on the content has been inputted in the display apparatus, the display device of the mobile communication terminal shows that the operation on the content has been inputted in the display apparatus.

According to the above display apparatus, the mobile communication terminal and the display system, it becomes possible to keep track of whether the mobile communication terminal or the display apparatus has been used to input the operate on content.

BRIEF DESCRIPTION OF THE DRAWINGS

The above and other objects, features and advantages of the present disclosure will become more apparent from the following detailed description made with reference to the accompanying drawings. In the drawings:

FIG. 14 is a diagram illustrating other forms of the display parts of the second embodiment when an operation is inputted in the onboard apparatus

DETAILED DESCRIPTION

A display apparatus, a mobile communication terminal, and a display system of embodiments will now be described by reference to the accompanying drawings. In the embodiments, like references are used to refer to like parts. In the following description, Bluetooth (registered trademark) is also referred to as BT.

First Embodiment

Figure 1:
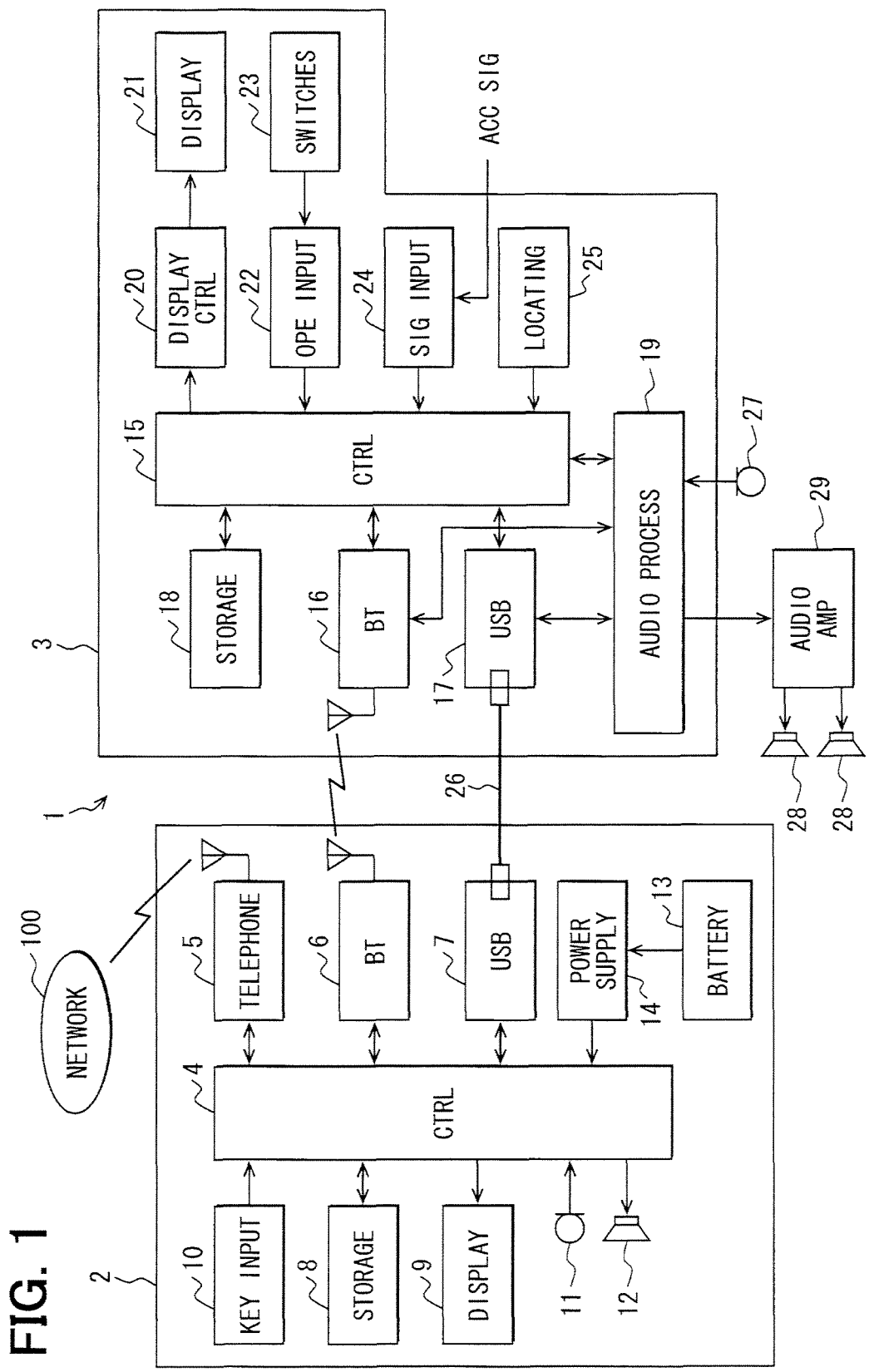
FIG. 1 is a block diagram illustrating a display system of a first embodiment.

A display system of a first embodiment will now be described by reference to FIGS. 1 through 10. As shown in FIG. 1, the display system 1 includes a mobile communication terminal 2 and an onboard apparatus 3. The mobile communication terminal 2 is also called a mobile communication apparatus. The onboard apparatus 3 is an example of display apparatus.

The mobile communication terminal 2 includes a terminal-side control part 4, a telephone communication part 5, a BT module 6, a USB (Universal Serial Bus) module 7, a storage part 8, a display part 9, a key input part 10, a microphone 11, a speaker 12, a battery 13, and a power supply part 14 connected to the battery 13. In the present embodiment, the mobile communication terminal 2 is assumed to be a so-called smartphone. The terminal-side control part 4 includes a microcomputer with a central processing unit (CPU, a random access memory (RAM), a read-only memory (ROM, and an input/output (I/O) bus (not shown). In accordance with computer programs stored in the ROM or storage part 8, the terminal-side control part 4 controls generally all of operations of the mobile communication terminal 2 such as communication operation, data management operation, and acquisition and execution of content (to be discussed later). The terminal-side control part 4 can correspond to a content execution means or device. In the present embodiment, the content execution means or device of the mobile communication terminal 2 is implemented by software (computer programs) executed by the terminal-side control part 4.

The telephone communication part 5 performs telephone communications via a communication network 100. The communication network 100 includes mobile phone base stations, base station control equipment, and other facilities offering mobile phone communication services by use of public networks. The telephone communication part 5 can correspond to a content acquisition means or device for acquiring diverse kinds of content such as music and pictures (including videos). The content acquired by the mobile communication terminal 2 includes not only the content downloaded and stored in the mobile communication terminal 2 but also content distributed by streaming (e.g., Internet radio) as well as information offered by search services and SNS (Social Networking Service).

The BT module 6 performs BT communications (short range communication) with the onboard apparatus 3 via a BT communication link. The BT module 6 is configured to be capable of establishing connection simultaneously using multiple profiles defined in the BT communication standard. These profiles refer to communication protocols defined on a function basis. In this case, the BT module 6 communicates with the onboard apparatus 3 to exchange the content and an operation on the content (e.g., execution, stop, selection of the content). For example, if the content to be executed is music, the operations on the content include playing and fast-forwarding the music, stopping the music, and selecting the music. The operations on the content further include starting and stopping application programs, which execute the content. The operations on the content further include selecting a type of the content that a user desires. That is, the operations on the content include various operations that the user inputs in connection with the content. The BT module 6 of the mobile communication terminal 2 can correspond to a notification means or device. The BT module is connectable with a microphone (not shown) to support hands-free communication.

The USB module 7 performs data communications with the onboard apparatus 3 via a USB communication link. The storage part 8 has storage areas for storing various data, including the above-mentioned computer programs, the acquired content, and the application programs for executing the content. The storage part 8 may include a detachable memory card or the like.

The display part 9 includes, for example, a liquid crystal display or an organic EL display. Based on display command signals from the terminal-side control part 4, the display part 9 displays various kinds of information. For example, the display part 9 displays an address book, received e-mails, information about the acquired content, and an operation screen for inputting the operations on the content. The display part 9 corresponds to a display means or device.

The key input part 10 is equipped with touch-sensitive switches (on a so-called touch panel) on the screen of the display part 9. The key input part 10 is further equipped with other keys and switches (not shown) around the display part 9. The touch-sensitive switches may be pressure-sensitive keys, electromagnetic induction type keys, capacitance type keys, or a combination of these keys. When the user operates any of these keys, the key input part 10 outputs to the terminal-side control part 4 an operation detection signal reflecting the user's key operation. The terminal-side control part 4 analyzes the operation detection signal inputted from the key input part 10, identifies the intent of the user's key operation, and notifies the onboard apparatus 3 of the intent of the user's key operation by BT communication. The key input part 10 corresponds to an operation input means or device.

During a telephone call, the microphone 11 inputs the voice of the user as an outgoing voice, and the speaker 12 outputs as an incoming voice the voice received by the telephone communication part 5 from the opposite party. The speaker 12 is also capable of outputting audio data that may be included in the above-described content being executed. The battery 13 is detachably attached to the body of the mobile communication terminal 2. The power supply part 14 supplies the terminal-side control part 4 and other functional parts with operating power from the battery 13.

The onboard apparatus 3 includes an apparatus-side control part 15, a BT module 16, a USB module 17, a storage part 18, an audio processing part 19, a display control part 20, a display part 21, an operation input part 22, operation switches 23, a signal input part 24, and a position acquisition part 25. In the present embodiment, the onboard apparatus 3 is installed in a compartment of the vehicle. The apparatus-side control part 15 of the onboard apparatus 3 includes a microcomputer with a CPU, a RAM, a ROM, and an I/O bus (not shown). In accordance with computer programs stored in the ROM or storage part 18, the apparatus-side control part 15 controls generally all of operations of the onboard apparatus 3 such as communication operation, data management operation and the like. The apparatus-side control part 15 executes the content acquired by the mobile communication terminal 2. The apparatus-side control part 15 can correspond to a content execution means or device. The content execution means or device of the onboard apparatus 3 is implemented by software (computer programs) executed by the apparatus-side control part 15.

The BT module 16 performs data communications with the mobile communication terminal 2 using a BT communication link. Specifically, the BT module 16 transmits and receives the content acquired by the mobile communication terminal 2. Additionally, when the operation on the content is inputted in the mobile communication terminal 2, the BT module 16 receives this inputted operation on the content by the data communication. Further, to the mobile communication terminal 3, the BT module 16 transmits (notifies) status of content execution in the onboard apparatus 3 as well as information about the operation inputted to the operation input part 22. The BT module 16 and the apparatus-side control part 15 can correspond to a notification means or device.

The USB module 17 is connected to the mobile communication terminal 2 via a connection cable 26 and can perform data communication with the mobile communication terminal 2 using a USB communication link. The storage part 18 includes a nonvolatile storage medium such as a hard disk drive and the like, and stores various programs such as the above-mentioned computer programs and application programs, and the data to be used by each program. The application programs include programs for executing the content. The storage part 18 may be incorporated in the onboard apparatus 3 or may be in the form of an external storage medium detachable from the onboard apparatus 3.

The audio processing part 19 is connected to a microphone 27 and to an audio amplifier 29 equipped with speakers 28. The audio processing part 19 is also connected to the apparatus-side control part 15. BT module 16, and USB module 17. The audio processing part 19 performs audio input and output processes. Specifically, the microphone 27 is in the vehicle compartment and installed at a place where it is easy to pick up the user's voice (e.g., near the steering wheel). The audio amplifier 29 is in the vehicle compartment and is external to the onboard apparatus 3. Based on the voice input from the microphone 27, the audio processing part 19 outputs instructions to the apparatus-side control part 15 as to operations of the onboard apparatus 3 or the like. Upon receipt of instructions from the apparatus-side control part 15 or BT module 16, the audio processing part 19 causes the speakers 28 to output sounds. In the present embodiment, the speakers 28 function as so-called stereo speakers.

The display control part 20 is connected to the display part 21. Based on the instructions from the apparatus-side control part 15, the display control part 20 controls displayed content of the display part 21 (i.e., display screen). The display part 21 may include a liquid crystal display or an organic EL display for example. Based on display command signals from the display control part 20, the display part 21 displays diverse kinds of information. The display part 21 has a screen with touch-sensitive switches (on a so-called touch panel). The touch-sensitive switches may be pressure-sensitive keys, electromagnetic induction type keys, capacitance type keys, or a combination of these keys. The display part 21 displays operations of the onboard apparatus 3, an operation screen for inputting the operations on the content and status of content execution, and the like. The display part 21 can correspond to a display means or device.

The operation input part 22 is connected to the operation switches 23, which include multiple switches mounted around the display part 21. The operation input part 22 detects the user's operations on the touch panel and those on the operation switches 23 and outputs operation detection signals reflecting the detected operations to the apparatus-side control part 15. Specifically, upon input of an operation detection signal from the operation switches 23 following the user's operation on a touch-sensitive switch or the like, the operation input part 22 outputs the input operation detection signal to the apparatus-side control part 15. The apparatus-side control part 15 analyzes the operation detection signal inputted from the operation input part 22, thereby identifying the intent of the user's operation. The operation switches 23 and the operation input part 22 can correspond to an operation input means or device. Upon input of the operation detection signal from the operation input part 22, the apparatus-side control part 15 outputs a display command signal to the display control part 20 based on the identified intent of the operation and notifies the intent of the operation to the mobile communication terminal 2 by BT communication via the BT module 16.

The signal input part 24 is connected to an ACC (accessory) switch (not shown) mounted to the vehicle. Upon input of an ACC signal from the ACC switch, the signal input part 24 forwards the ACC signal to the apparatus-side control part 15. Based on ON/OFF of the ACC signal outputted from the signal input part 24, the apparatus-side control part 15 performs a control operation to turn on or off a power supply circuit (not shown). That is, when the ACC signal transitions from OFF to ON, the apparatus-side control part 15 turns on the power supply circuit (i.e., starts the onboard apparatus 3); when the ACC signal transitions from ON to OFF, the apparatus-side control part 15 turns off the power supply circuit (i.e., stops the onboard apparatus 3). In an alternative structure, a microcomputer apart from the apparatus-side control part 15 may turn on and off the power supply circuit.

The position acquisition part 25 includes a magnetic field sensor, gyroscope, speed sensor, and GPS receiver (not shown). The position acquisition part 25 receives detection signals from the magnetic field sensor, gyroscope, speed sensor, and GPS receiver and obtains vehicle position information by compensating the detection signals each other. In such a case, if the vehicle position information can be acquired with a required level of detection accuracy, the position acquisition part 25 needs not include all of the above-described components. It is also possible to configure the position acquisition part 25 using a combination of a steering sensor for detecting steering angle and/or tire wheel sensors for detecting the revolutions of each tire wheel (not shown). The position acquisition part 25 outputs the acquired position information of the own vehicle to the apparatus-side control part 15. Based on the vehicle position information acquired by the position acquisition part 25, the apparatus-side control part 15 performs so-called navigation processing. That is, with this embodiment, a navigation apparatus is used as the onboard apparatus 3.

In the display system 1, the mobile communication terminal 2 and the onboard apparatus 3 operate independently if they are not communicably connected to each other, e.g., if a BT communication connection is not established between the mobile communication terminal 2 and the onboard apparatus 3. Specifically, when the mobile communication terminal 2 and the onboard apparatus 3 are not connected to each other, the content acquired by the mobile communication terminal 2 is executed by a suitable application program which is run by the terminal-side control part 4 of the mobile communication terminal 2.

Where the mobile communication terminal 2 and the onboard apparatus 3 are connected to each other by BT communication, the mobile communication terminal 2 and the onboard apparatus 3 operate in cooperation with each other. Specifically, the mobile communication terminal 2 executes a SP-cooperation application (application program), and additionally, the onboard apparatus 3 executes a SP-cooperation application (application program). The onboard-apparatus-cooperation application and the SR-cooperation application enable the following. The content acquired by the mobile communication terminal 2 becomes operable from both of the mobile communication terminal 2 and the onboard apparatus 3. At this time, the mobile communication terminal 2 and the onboard apparatus 3 exchange information on how they are operated. Because of this, the display part of each of the mobile communication terminal 2 and the onboard apparatus 3 displays substantially the same operation screen, or display different operation screens providing substantially the same information.

Figure 2:
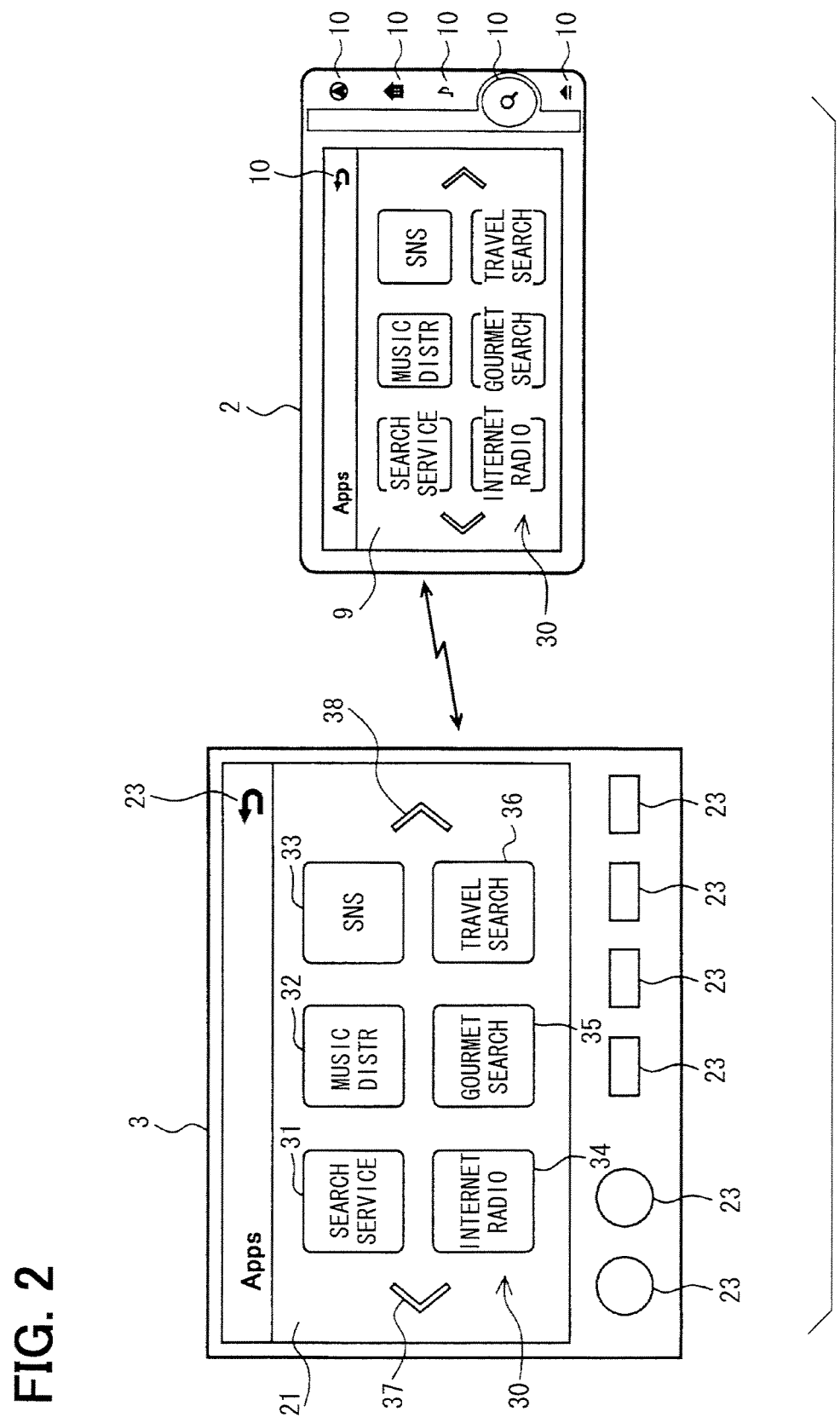
FIG. 2 is a diagram illustrating a connection between a display apparatus and a mobile communication terminal.

An operation screen displayed on the mobile communication terminal 2 and on the onboard apparatus 3 is first explained below. In FIG. 2, the display part 21 of the onboard apparatus 3 displays a start menu 30 for launching application programs for content execution. For example, the start menu 30 includes a search service icon 31, a music distribution icon 32, an SNS icon 33, an Internet radio icon 34, a gourmet search icon 35, and a travel search icon 36. The icons 31 through 36 are used to input operations to start the individual application programs for executing the corresponding content.

Each of the individual application programs is provided for each of different types of content. Every time a left button 37 or a right button 38 displayed on the operation screen is touched, the icons of other application programs are brought into view. The individual application programs are stored in the storage part 18. In response to the user's operation, the corresponding application program is started. The display part 9 of the mobile communication terminal 2 displays a start menu 30 similar to that appearing on the onboard apparatus 3. When an operation on an icon is inputted in either the mobile communication terminal 2 or the onboard apparatus 3, e.g., when an operation to start the application program is inputted from the user to either the mobile communication terminal 2 or the onboard apparatus 3 to executing his or her desired content, the application program corresponding to the operation is started and the content is executed. The operations on the icons displayed on the start menu 30 are examples of the operations on the content. In the present embodiment, when the mobile communication terminal 2 and the onboard apparatus 3 are connected to each other, the content is executed on the onboard apparatus 3. For example, the music is outputted from the speakers 28 connected with the onboard apparatus 3.

Figure 3:
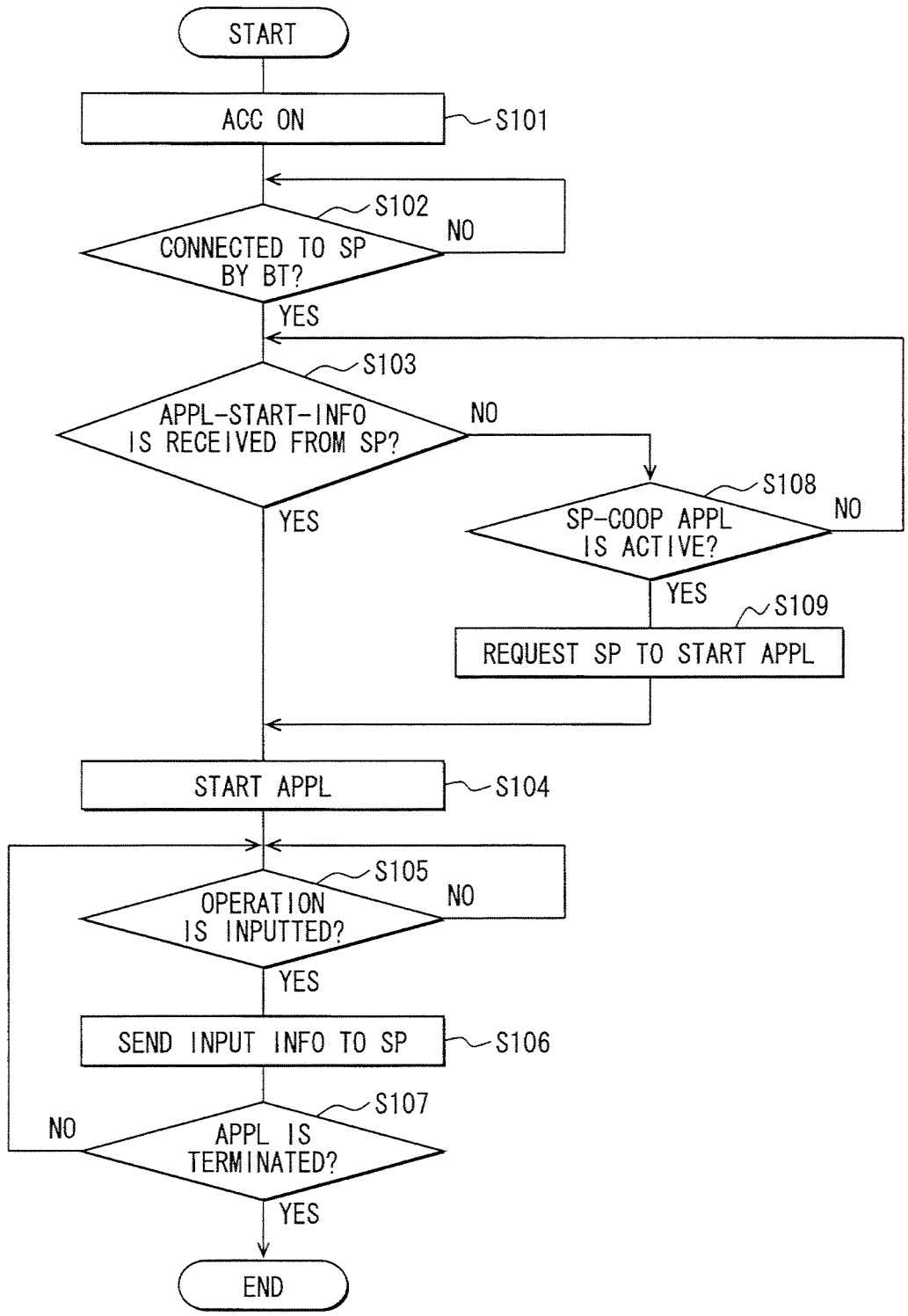
FIG. 3 is a flowchart illustrating an onboard apparatus-side process, which is performed by the onboard apparatus.
Figure 4:
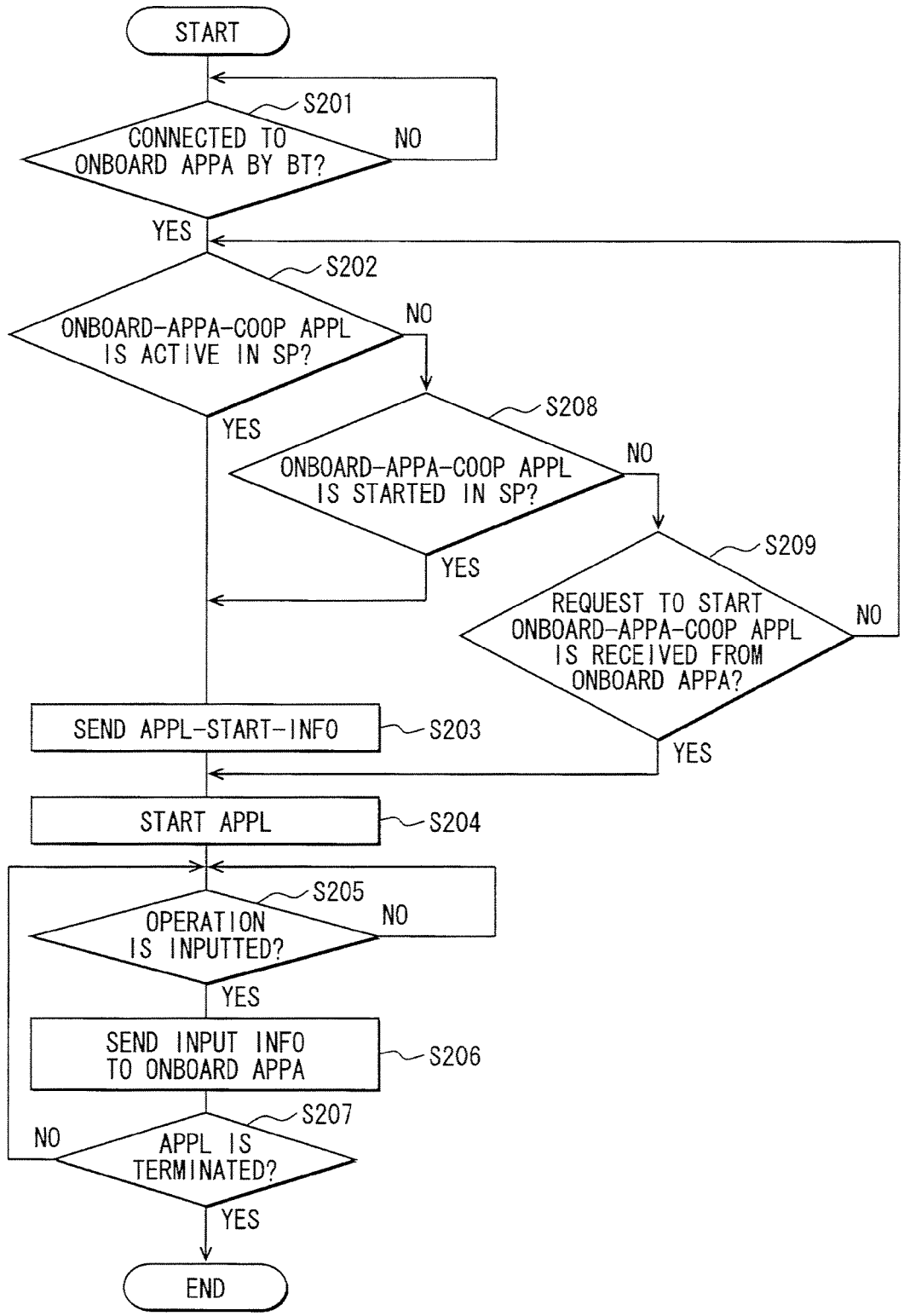
FIG. 4 is a flowchart illustrating a terminal-side process, which is performed by the mobile communication terminal.
Figure 5:
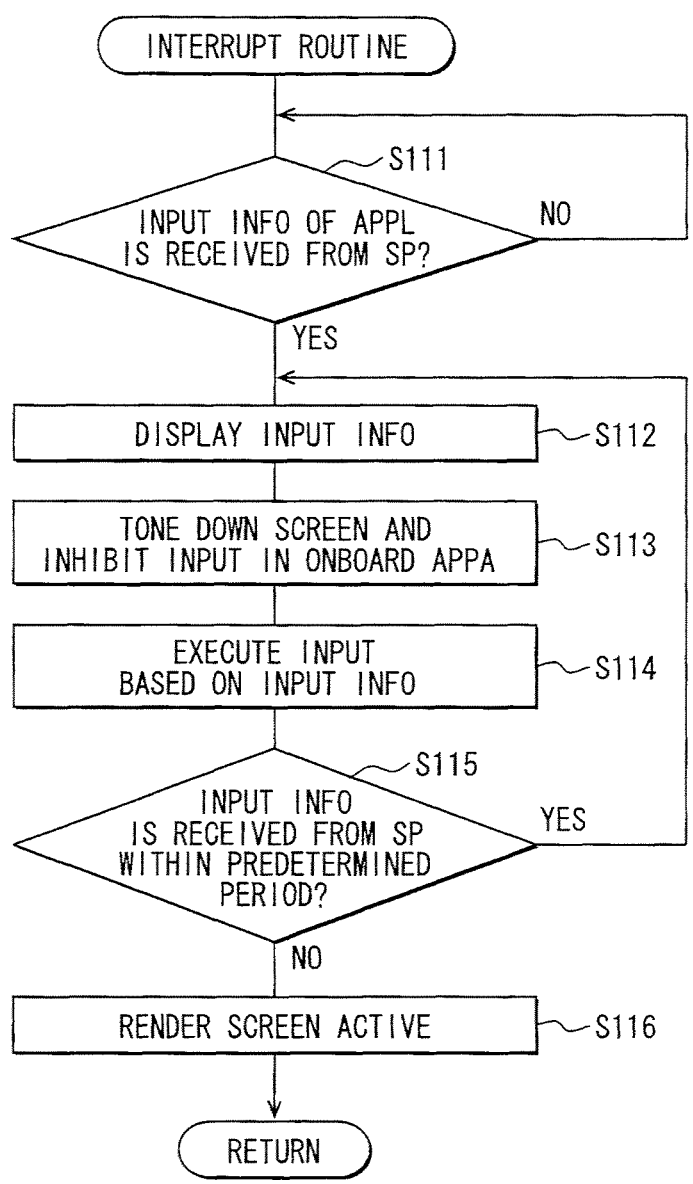
FIG. 5 is a flowchart illustrating an interrupt routine performed by the onboard apparatus.

The display system 1 will be more specifically described with reference to FIGS. 3 to 6. The mobile communication terminal 2 may be a smartphone. For illustrative purpose, in the present disclosure, the mobile communication terminal 2 is called SP, and the application program is called application. FIG. 3 is a flowchart illustrating an onboard apparatus-side process, which is performed by the apparatus-side control part 15 of the onboard apparatus 3. FIG. 4 is a flowchart illustrating a terminal-side process, which is performed by the terminal-side control part 4 of the mobile communication terminal 2. The below-described processes are executed by the mobile communication terminal 2 (specifically, the terminal-side control part 4) and by the onboard apparatus 3 (specifically, the apparatus-side control part 15).

As shown in the onboard apparatus-side process of FIG. 3, in response to turning on the ACC switch at S101, the onboard apparatus 3 performs S102. At S102, the onboard apparatus 3 makes a determination as to whether the onboard apparatus 3 is connected with the SP (mobile communication terminal 2) by for example, the BT. When the onboard apparatus 3 is not connected with the SP ("NO" in S102), the onboard apparatus 3 repeats the determination until the connection is established.

As shown in the terminal-side process of FIG. 4, at S201, the mobile communication terminal 2 makes a determination as to whether the mobile communication terminal 2 is connected with the onboard apparatus 3 by, for example, BT. When the mobile communication terminal 2 is not connected with the onboard apparatus 3 ("NO" at S201), the mobile communication terminal 2 repeats this determination until the connection is established.

When the mobile communication terminal 2 and the onboard apparatus 3 are located sufficiently close to each other for BT communication (specifically, when the mobile communication terminal 2 is carried into the vehicle compartment), the mobile communication terminal 2 and the onboard apparatus 3 are connected to each other and become communicable by BT. With this embodiment, it is assumed that the mobile communication terminal 2 and the onboard apparatus 3 had been connected to each other by BT, and that information necessary to perform the BT communication between the mobile communication terminal 2 and the onboard apparatus 3 are already registered in the mobile communication terminal 2 and the onboard apparatus 3). Whenever the mobile communication terminal 2 and the onboard apparatus 3 are located close enough to perform the BT communication, they automatically establish connection therebetween by BT without the user's operation.

Upon determining that the mobile communication terminal 2 is connected to the onboard apparatus 3 by BT ("YES" at S201 in the terminal-side process of FIG. 4), the mobile communication terminal 2 determines whether the onboard-apparatus-cooperation application is active in the mobile communication terminal 2 (S202). The onboard-apparatus-cooperation application is an application program that allows the mobile communication terminal 2 to cooperate with the onboard apparatus 3. If the onboard-apparatus-cooperation application is already active ("YES" at S202), the mobile communication terminal 2 transmits application start status information to the onboard apparatus 3 (S203). The application start status information, which is also called herein application start information, is information indicating whether or not the onboard-apparatus-cooperation application is active in the mobile communication terminal 2. Then the mobile communication terminal 2 starts the onboard-apparatus-cooperation application (S204) and waits for the user to input the operation ("NO" at S205). It should be noted that when the onboard-apparatus-cooperation application is active ("YES" at S202), what is done at S204 is merely confirming that the application is active.

When the onboard apparatus 3 determines that the onboard apparatus 3 is connected with the SP by BT in the onboard apparatus-side process of FIG. 3 ("YES" at S102), the onboard apparatus 3 determines whether the application start status information is received from the SP (S103). When the mobile communication terminal 2 transmits the application start status information (S203) and when the onboard apparatus 3 determines that the application start status information is received from the mobile communication terminal 2 ("YES" at S103), the onboard apparatus 3 starts the SP-cooperation application (S104) and waits for the user to input the operation ("NO" at S105).

Through the above processes, the display part of each of the onboard apparatus 3 and the mobile communication terminal 2 displays the start menu 30 such as one shown in FIG. 2. Specifically, when the mobile communication terminal 2 and the onboard apparatus 3 are connected to each other by BT, they start the onboard-apparatus-cooperation application and the SP-cooperation application to enable operations on the content in mutually cooperating fashion. The mobile communication terminal 2 and the onboard apparatus 3 then wait for the input of the operation, e.g., wait for the user to operate the operation switches 23 or the key input part 10. In response to the input of the operation, a corresponding application program is executed. After the mobile communication terminal 2 and the onboard apparatus 3 are connected to each other, the mobile communication terminal 2 and the onboard apparatus 3 are in a wait state, so that the operation on the content is inputtable from both the mobile communication terminal 2 and the onboard apparatus 3 at this point.

If the onboard-apparatus-cooperation application is not started in the terminal-side process of FIG. 4 ("NO" at S202), the mobile communication terminal 2 determines whether the onboard-apparatus-cooperation application is started in the SP (8208). The mobile communication terminal 2 further determines whether start request information is received from the onboard apparatus 3 (S209). The start request information request is a request to start the onboard-apparatus-cooperation application. When the onboard-apparatus-cooperation application is active (has been started) in the SP, more specifically when the user has performed the operation to start the onboard-apparatus-cooperation application ("YES" at S208), the mobile communication terminal 2 transmits the application start status information to the onboard apparatus 3 (S203), and starts the onboard-apparatus-cooperation application (S204). When the start request information for starting the onboard-apparatus-cooperation application is received from the onboard apparatus 3 ("YES" at S209), the mobile communication terminal 2 starts the onboard-apparatus-cooperation application (S204).

When the onboard apparatus 3 has not acquired the application start status information from the SP in the onboard apparatus-side process of FIG. 3 ("NO" at S103) and when the SP-cooperation application has been started in the onboard apparatus 3 in response to user operation to start the SP-cooperation application ("YES" at S108), the onboard apparatus 3 transmits the start request information to request the SP to start the application (S109). Thereafter, the onboard apparatus 3 starts the SP-cooperation application (S104). Specifically, when one of the mobile communication terminal 2 and the onboard apparatus 3 is operated to start one of the SP-cooperation application and the onboard-apparatus-cooperation application, the other of the SP-cooperation application and the onboard-apparatus-cooperation application is automatically started on assumption that the user has expressed his or her intention to use a cooperation function of the mobile communication terminal 2 and onboard apparatus 3.

Once the content becomes operable from both of the mobile communication terminal 2 and the onboard apparatus 3, different users can operate the content by using the mobile communication terminal 2 and the onboard apparatus 3. In such a case, the merely displaying of the operation screens (start menu 30) on both apparatuses (see FIG. 2) may make it difficult for the users to grasp which of the operation screens has been operated. The users may be confused. In view of this, the display system 1 of the present embodiment provides displays that allow the users to see which one of the mobile communication terminal 2 and the onboard apparatus 3 is being used to input the operations.

Figure 7:
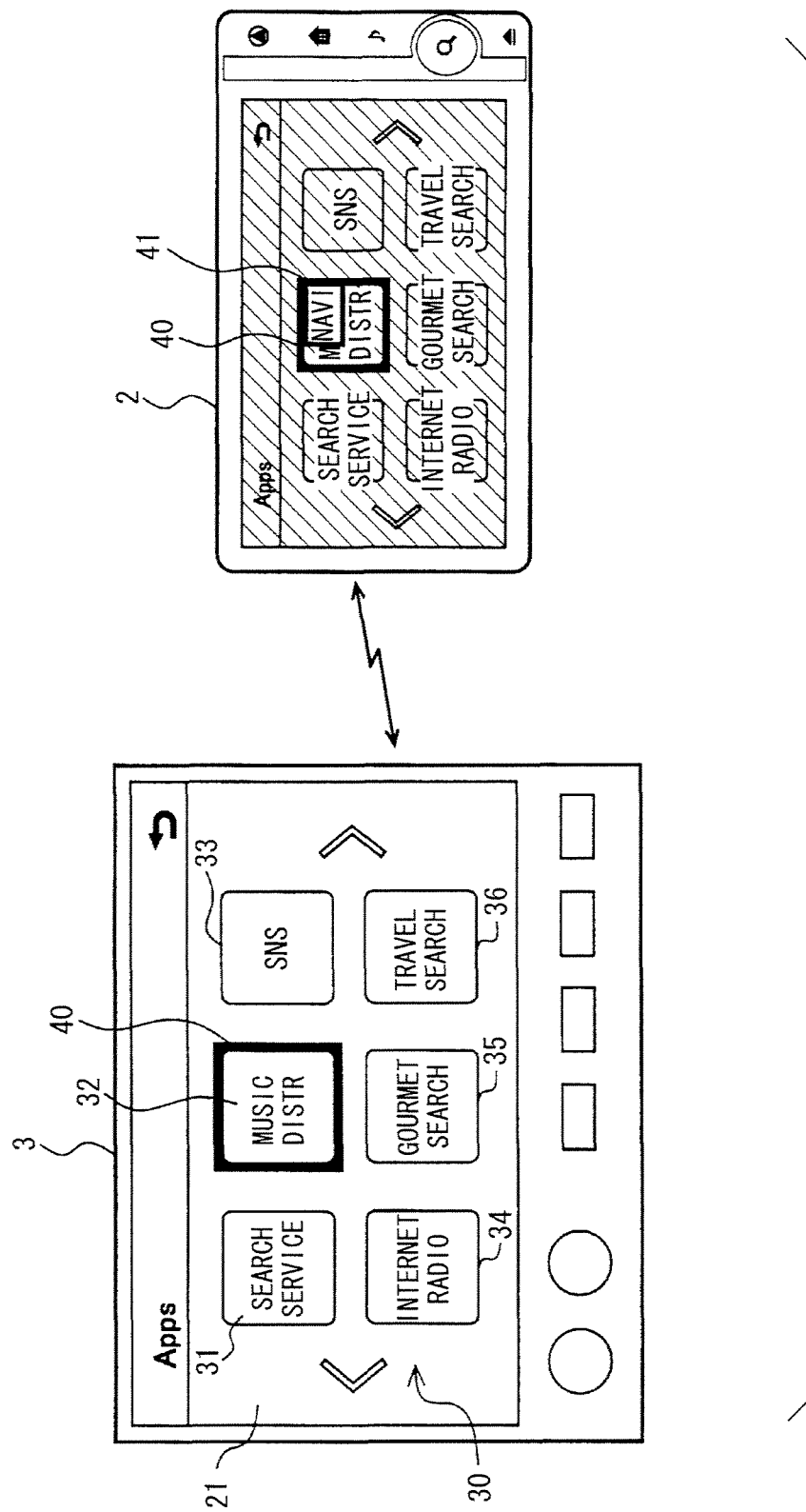
FIG. 7 is a diagram illustrating display parts when an operation is inputted in the onboard apparatus.

For example, if the onboard apparatus 3 is used to input the operation, the onboard apparatus 3 recognizes the user's input operation in the onboard apparatus-side process of FIG. 3 ("YES" at S105) and performs a process corresponding to the inputted operation. Specifically, if an operation to execute music distribution is inputted, e.g., if the user operates the music distribution icon 32 in the start menu 30, the onboard apparatus 3 superimposes a selection frame 40 on the music distribution icon 32 of the display part 21, as shown in FIG. 7. That is, the onboard apparatus 3 highlights the icon corresponding to the inputted operation (icon 32) relative to the other icons (icons 31, 33 through 36), so that the user can recognize his or her selection. Thereafter, the onboard apparatus 3 transmits (communicate) input information, which is information about the inputted operation, to the SP (S106). In this case, the mobile communication terminal 2 acquires the input information indicating that the music distribution icon 32 has been operated.

Figure 6:
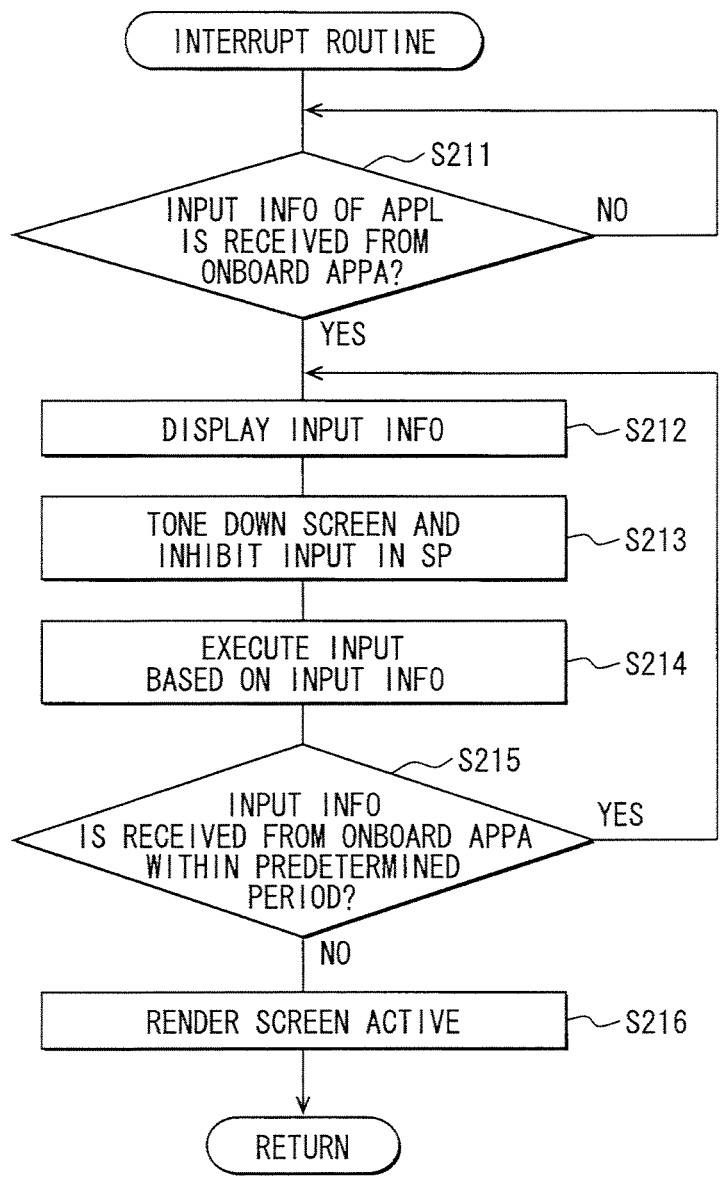
FIG. 6 is a flowchart illustrating an interrupt routine performed by the mobile communication terminal.

When the mobile communication terminal 2 is ready to execute an interrupt routine illustrated in FIG. 6 and then receives the input information from the onboard apparatus 3 ("YES" at S211), the mobile communication terminal 2 displays the received input information on its own display part 21 (S212). Specifically, the mobile communication terminal 2 displays on the display part 9 an operation source icon 41 (indicated as "NAVI" in FIG. 7) which corresponds to the music distribution icon 32 operated in the onboard apparatus 3 and which indicates that the music distribution icon 32 has been operated in the onboard apparatus 3, as shown in FIG. 7. The mobile communication terminal 2 then tones down screen brightness and prohibits (inhibits) the input of the operations in the SP (S213). Specifically, the mobile communication terminal 2 renders the brightness on its own display part 9 relatively lower than the brightness on the display part 21 of the onboard apparatus 3 which has been operated by the user. Thereafter, the mobile communication terminal 2 executes processing based on the inputted operation, i.e., starts up a music play application program because the music distribution icon 32 has been selected (S214). Consequently, as shown in FIG. 7, the display part 21 of the mobile communication terminal 2 has the brightness of its entire screen rendered lower than the brightness on the display part 21 of the onboard apparatus 3 while displaying the music distribution icon 32 supplemented with the selection frame 40. In FIG. 7, the state of reduced brightness is shown using hatching.

Figure 8:
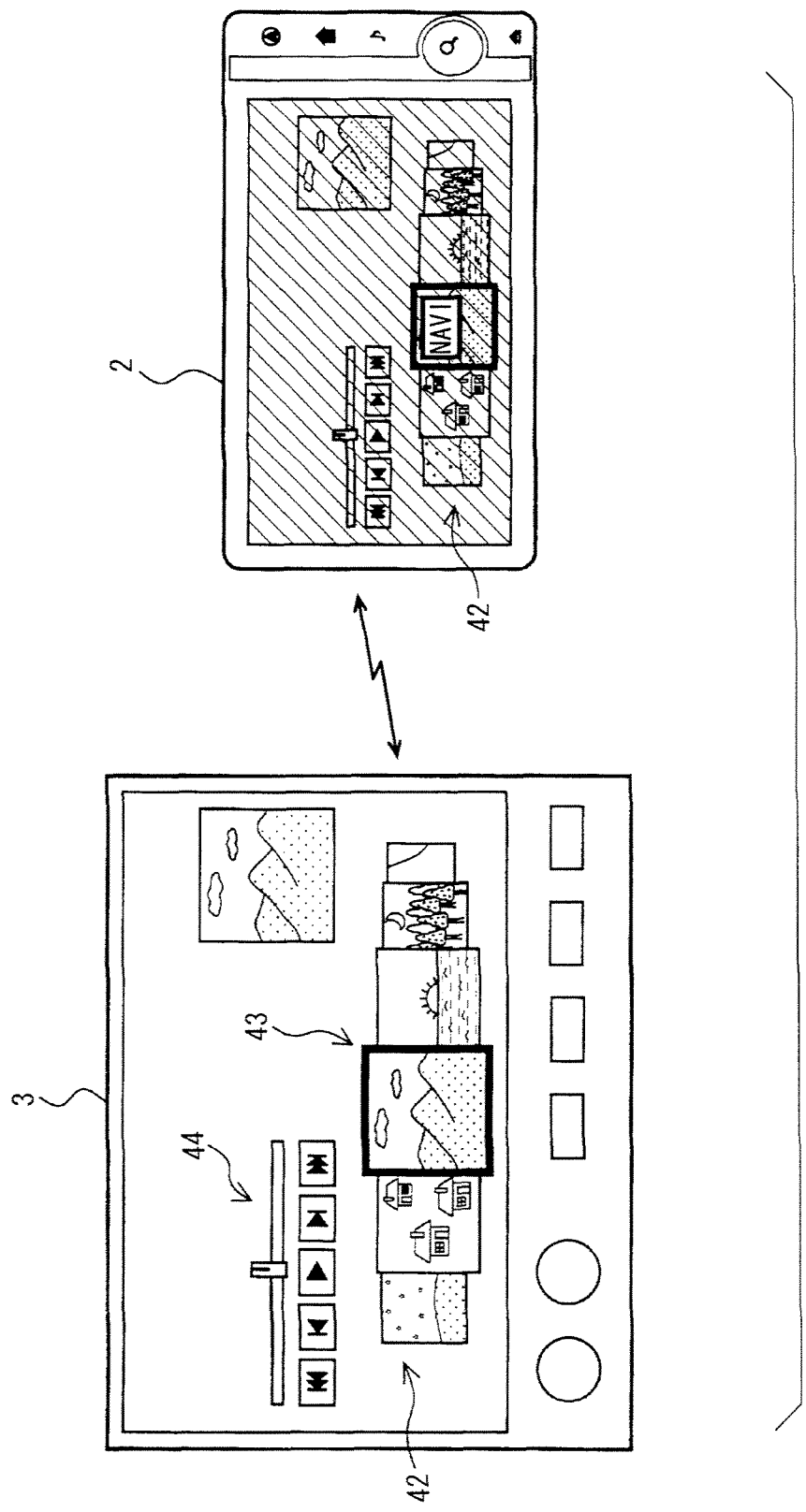
FIG. 8 is a diagram illustrating a change in screen of the display parts when an operation is inputted in the onboard apparatus.

Meanwhile, as shown in FIG. 8, the onboard apparatus 3, in which the music distribution icon 32 has been selected, starts an application program corresponding to music distribution. The display part 21 of the onboard apparatus 3 displays a music play application screen 42. The music play application screen 42 provides an operation menu 43 for selecting music (tracks) and an operation menu 44 for volume control and fast-forward. The display part 9 of the mobile communication terminal 2 also displays the music play application screen 42 shown in FIG. 8. That is, when the mobile communication terminal 2 is notified that the operation has been inputted in the onboard apparatus 3 (the peer connected to mobile communication terminal 2), the mobile communication terminal 2 changes the display screen of its own display part 9 in accordance with this notification. At this point, the screen of the mobile communication terminal 2 is kept toned down and the prohibition of the input of operation in the SP is still in effect Then the mobile communication terminal 2 determines whether any new input information is received from the onboard apparatus 3 within a predetermined time period (e.g., 5 seconds) after execution of S214 in the interrupt routine of FIG. 6 (S215). If no new input information is received ("NO" at S215), the mobile communication terminal 2 renders the screen active at S216. For example, the mobile communication terminal 2 ends the toned-down state and cancels the inhibition of the input of the operation in the SP. Because of this, the input of operations using the mobile communication terminal 2 is allowed. If new input information is received within the predetermined time period ("YES" at S215), the process proceeds to S212. In the above, the predetermined time period may be an arbitrarily settable time period.

Figure 9:
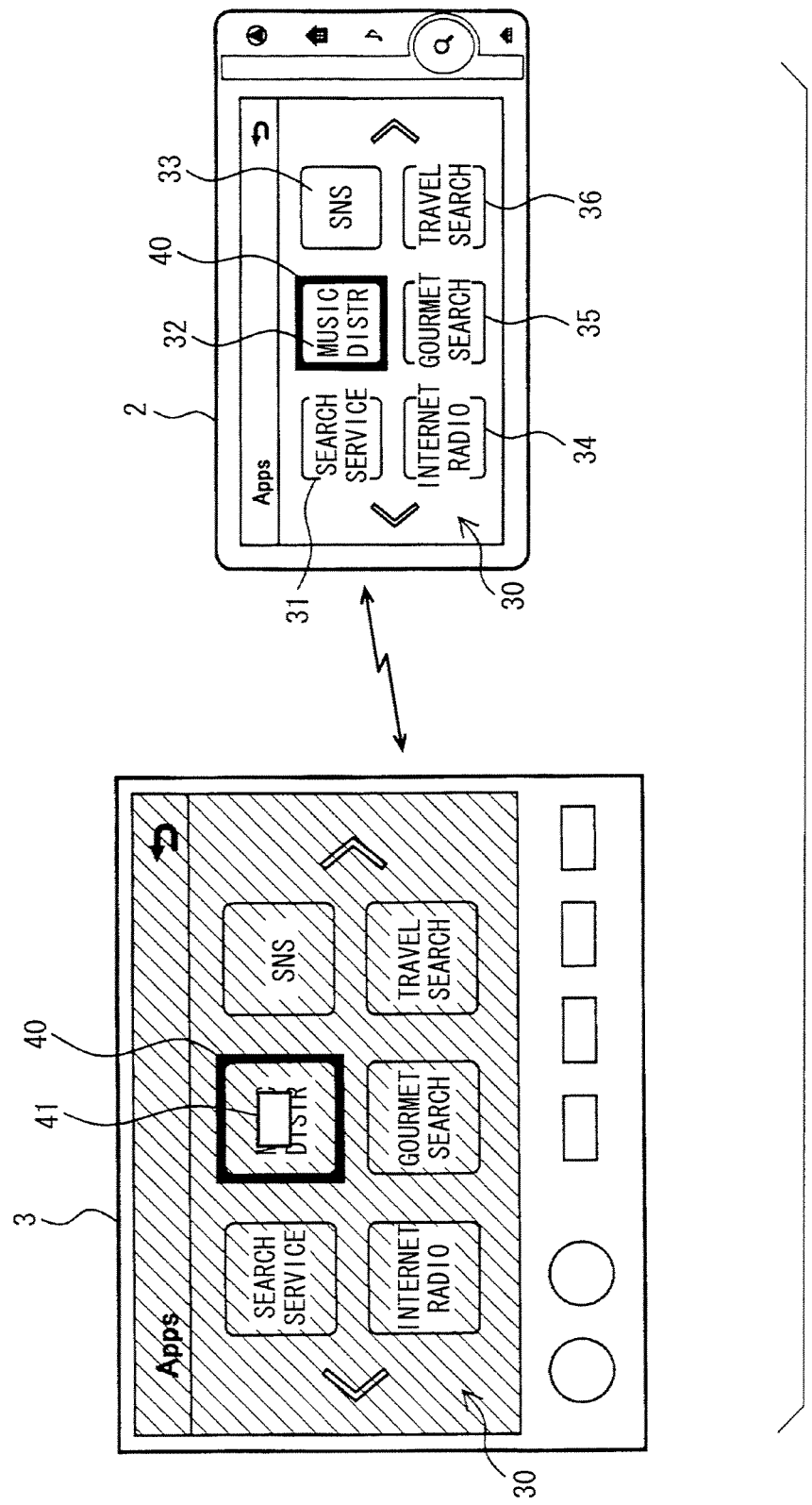
FIG. 9 is a diagram illustrating the display parts function when an operation is inputted in the mobile communication terminal.
Figure 10:
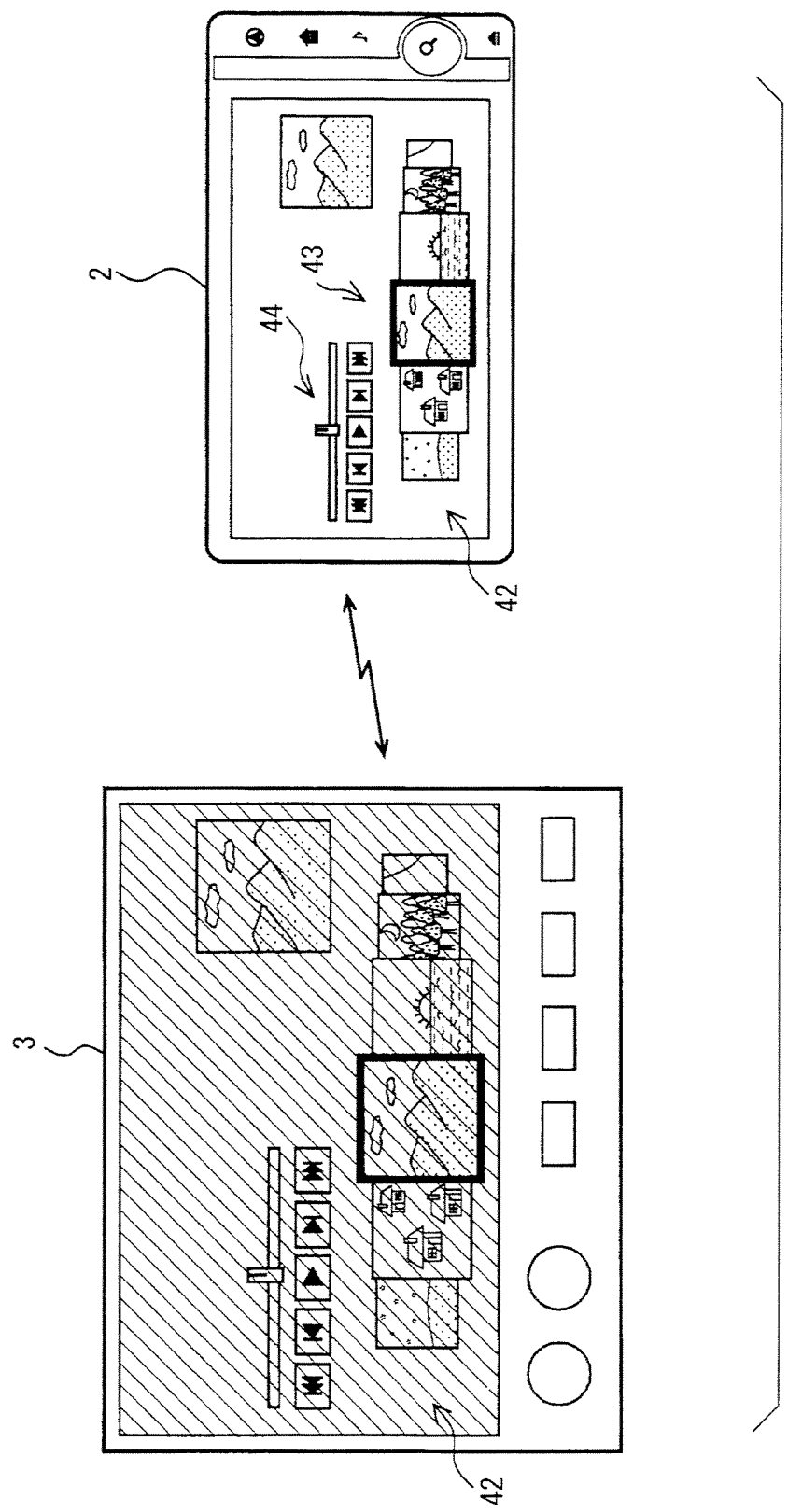
FIG. 10 is a diagram illustrating a change in screen of the display parts when an operation is inputted in the mobile communication terminal.

Similar processing is carried out when the operation is inputted in the mobile communication terminal 2. Specifically, if the operation is inputted by the user in the mobile communication terminal 2 in the terminal-side process of FIG. 4 ("YES" at S205), the mobile communication terminal 2 transmits (notifies) the input information to the onboard apparatus 3 (S206). At this point, the mobile communication terminal 2 superimposes the selection frame 40 on the selected music distribution icon 32, as shown in FIG. 9. When the onboard apparatus 3, which is in await state where the onboard apparatus 3 is ready to execute the interrupt routine shown in FIG. 5, receives the input information from the SP ("YES" at S111), the onboard apparatus 3 displays the selection frame 40 on the corresponding operation source icon 41 (S112) based on the inputted operation as shown in FIG. 9, tones down the screen brightness while inhibiting the input of operation (S113), and changes the screen (S114) as shown in FIG. 10 based on the input information (which indicates the start of the music distribution application in this example). The onboard apparatus 3 then determines whether any new input information is received from the SP within the predetermined time period (S115). If new input information is received ("YES" at S115), the process proceeds to S112. If the new input information is not received ("NO" at S115), the onboard apparatus 3 renders the screen active (S116).

In the display system 1, when the mobile communication terminal 2 and the onboard apparatus 3 are connected to each other by BT and their respective cooperation applications are started, the operation on the content inputted to one of the two apparatuses (e.g., onboard apparatus 3) causes the following. The other apparatus (e.g., mobile communication terminal 2) is notified of the input information. Based on this notification, the other apparatus tones down the brightness of its own screen, prohibits the input of the operation in the other apparatus, and changes the display screen of its own display part in accordance with the input of the operation in the peer (the one of the two apparatuses). It should be noted that even when the operation on the content other than music distribution is inputted, substantially the same processes (e.g., screen transition) are performed.

When an operation to terminate the cooperation application is inputted in the mobile terminal apparatus 2 or the onboard apparatus 3 ("YES" at S107 of FIG. 3, or "YES" at S207 of FIG. 4), the execution of the cooperation application is terminated.

As explained above, when the operation on the content is inputted in the mobile communication terminal 2, the onboard apparatus 3 of this embodiment displays information indicating that the operation has been inputted in the mobile communication terminal 2. This allows the user of the onboard apparatus 3 to recognize that the operation on the content has been inputted in the mobile apparatus 2. Usability improves.

When the mobile communication terminal 2 is notified that the operation on the content is inputted in the onboard apparatus 3, the mobile communication terminal 2 causes the display part 9 to indicate that the operation on the content has been input in the onboard apparatus 3. This allows the user of the mobile communication terminal 2 to recognize that the operation on the content has been inputted in the onboard apparatus 3. Usability is enhanced.

When the mobile communication terminal 2 and the onboard apparatus 3 (display apparatus) are connected to each other in the display system 1 the content acquired by the mobile communication terminal 2 becomes operable by the input with use of any one of the mobile communication terminal 2 and the onboard apparatus 3. When one of the mobile communication terminal 2 and the onboard apparatus 3 is used to input the operation, the one notifies the peer (the other of the mobile communication terminal 2 and the onboard apparatus 3) that the operation has been inputted in the one. The other, which has received the notification, causes its own display part to indicate that the operation has been input to the one. In this manner, in cases where display parts of both of the mobile communication terminal 2 and the onboard apparatus 3 display substantially the some operation screen or different operation screens providing substantially the same information, it is possible show which of the mobile communication terminal 2 and the onboard apparatus 3 has been operated. This allows the users of both apparatuses to recognize in which one of the apparatuses the operation on the content has been inputted. Usability improves.

When notified that the operation has been inputted in the peer, the mobile communication terminal 2 or the onboard apparatus 3 renders the brightness of its own display device (means) relatively lower than the brightness of the display device of the peer. This makes it possible to recognize in which one of the apparatuses the operation has been inputted.

Furthermore, when notified that the operation has been inputted in the peer, the mobile communication terminal 2 or the onboard apparatus 3 highlights the icon corresponding to the notified operation relative to the other icons displayed on its own display device (means). This also makes it easy to recognize in which one of the apparatuses the operation has been inputted.

When notified that the operation has been inputted to the peer, the mobile communication terminal 2 or the onboard apparatus 3 prohibits of the input of operations in its own operation input device (means), e.g., key input part 10, operation switches 23. For example, if the user of the mobile communication terminal 2 inputs the operation to execute given content while the user of the onboard apparatus 3 inputs the operation to stop the content, the operation inputted earlier in one of the apparatuses than in the other takes priority. This prevents the content from getting changed in rapid succession.

Furthermore, when notified that the operation has been inputted to the peer, the mobile communication terminal 2 or the onboard apparatus 3 changes the display of its own display part in accordance with the notified operation. This makes it possible to recognize in which of the apparatuses the operation has been input and what kind of operation has been inputted to the peer.

When the mobile communication terminal 2 and the onboard apparatus 3 are connected to each other, the apparatus-side control part 15 of the onboard apparatus 3 executes the content. This reduces the power consumption of the mobile communication terminal 2, which is driven with the battery 13. Thus, after the user disconnects the connection between the mobile communication terminal 2 and the onboard apparatus 3 and takes the mobile communication terminal 2 out of the vehicle, a long run time (long battery runtime) of the mobile communication terminal 2 is ensured. Usability improves. Furthermore, since the display part 21 of the onboard apparatus 3 generally has a wider screen than the display part 9 of the mobile communication terminal 2, and since the audio amplifier 29 and speakers 28 connected to the onboard apparatus 3 usually offer better sound quality than their counterparts attached to the mobile communication terminal 2, a rich content execution environment is realized.

Furthermore, in the present embodiment, the mobile communication terminal 2 and the onboard apparatus 3 can display the operation screens in substantially the same form, and can notify, in substantially the same form (e.g., brightness tone down and highlighting), that the operation has been inputted to one of the apparatuses. As a result, without experiencing confusion, the user can input the operation to both of the mobile communication terminal 2 and the onboard apparatus 3. The usability improves.

(Modification of First Embodiment)

A modification of the first embodiment will be described with reference to FIGS. 11 and 12. In this modification, each party displays the presence of the peer in a manner different from the first embodiment.

Figure 11:
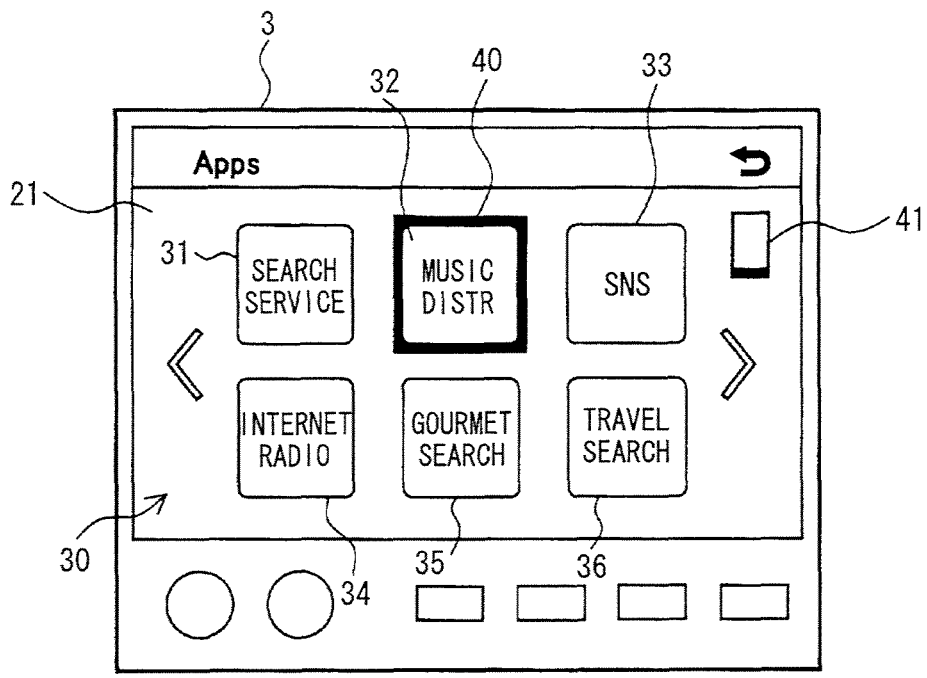
FIG. 11 is a diagram illustrating a screen of the onboard apparatus in accordance with a modification of the first embodiment.
Figure 12:
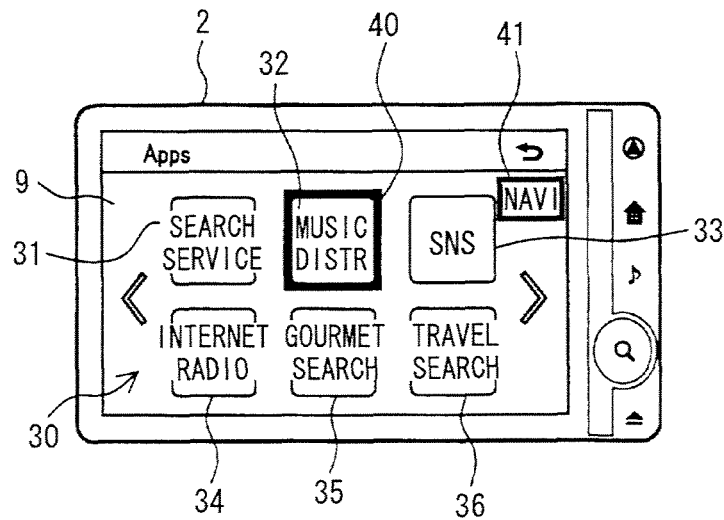
FIG. 12 is a diagram illustrating a screen of the mobile communication terminal in accordance with the modification of the first embodiment.

In the display system of one modification of the first embodiment, when an operation is inputted in, for example, the mobile communication terminal 2, the start menu 30 appearing on the display part 21 of the onboard apparatus 3 displays an selection frame 40 on the selected icon (e.g., music distribution icon 32) so that the selected icon is highlighted as compared with that on the ordinary screen (see FIG. 2), and additionally, the start menu 30 displays an operation source icon 41 to indicate the peer, as shown in FIG. 11. When the operation has been inputted in the onboard apparatus 3, the start menu 30 appearing on the display part 9 of the mobile communication terminal 2 displays the selection frame 40 on the selected icon (e.g., music distribution icon 32) to highlight the selected icon and further displays the operation source icon 41 to indicate the peer, as shown in FIG. 12.

As can be seen from the above, by relatively highlighting a portion of the display screen of the own display part in accordance with the notified operation, the display system enables the user to recognize in which of the two apparatuses (mobile communication terminal 2 and onboard apparatus 3) the operation has been inputted. In this modification also, when the operation is inputted to one of the apparatuses, the input of the operation in the other of the apparatuses may be prohibited.

Second Embodiment

A display system 50 of a second embodiment will be described with reference to FIGS. 13 and 14. The display system 50 of the second embodiment is different from the first embodiment in that multiple mobile communication terminals are connected to the onboard apparatus. The configuration of the onboard apparatus and that of each mobile communication terminal in the second embodiment can be substantially the same as in the first embodiment.

Figure 13:
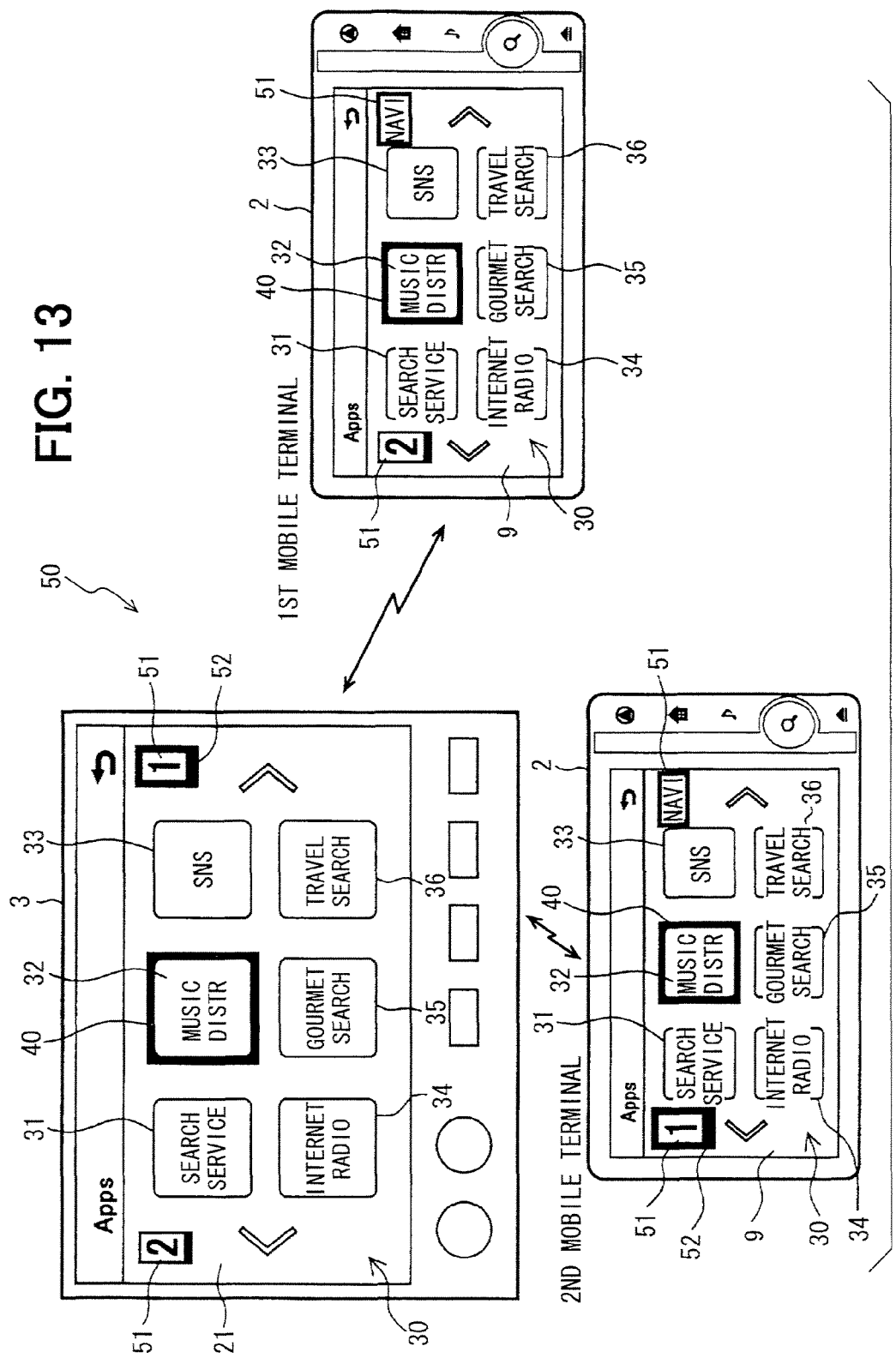
FIG. 13 is a diagram illustrating the display parts of a second embodiment when an operation is inputted in the onboard apparatus.

In the display system 50 of the second embodiment, as shown in FIG. 13, multiple mobile communication terminals 2 (e.g., first and second mobile terminals) are connected to the onboard apparatus 3. In this case, the peer connected to each of the first and second mobile terminals is the onboard apparatus. For example, via the onboard apparatus 3, the first mobile terminal acquires information indicating that another mobile terminal (second mobile terminal) is also connected to the onboard apparatus 3. Thus, in the display system 50, there are multiple states of one-to-one connection between the onboard apparatus 3 and the mobile communication terminal 2. The onboard apparatus 3 is configured to manage the states of connections with respective first and second mobile terminals.

Each of the first and second mobile terminals executes the onboard-apparatus-cooperation application while the onboard apparatus 3 performs the SP-cooperation application. Because of this, the operation on the content becomes inputtable from the first mobile terminal, the second mobile terminal and onboard apparatus 3.

The display part 21 of the onboard apparatus 3 displays multiple connected-apparatus icons 51 corresponding to the respective connected mobile communication terminals 2 (two terminals in this example), and the display part 9 of each of the multiple mobile communication terminals 2 displays the connected-apparatus icons 51 representing the other mobile terminal and the onboard apparatus 3. In this state, if the operation is inputted to the first mobile terminal (one of the mobile communication terminals 2), the same processes as those discussed in connection with the first embodiment (see FIGS. 3 through 6) are carried out. More specifically, upon receipt of the input information from the first mobile terminal, the onboard apparatus 3 displays a selection frame 52 on the connected-apparatus icon 51 indicating the first mobile terminal, and transfers the input information to the other mobile terminal 2 also connected to the onboard apparatus 3. Consequently, the display part 21 of the other mobile terminal 2 displays the selection frame 52 on the connected-apparatus icon 51 indicating the first mobile terminal, and also displays the selection frame 40 on the icon corresponding to the inputted operation (i.e., music distribution icon 32).

As explained, when multiple mobile communication terminals 2 are connected in the display system 50 of the second embodiment, the selection frame 52 on the connected-apparatus icon 51 enables the user to easily recognize in which of the apparatuses the operation has been inputted. As shown in FIG. 14, the display parts 9 and 21 other than the display part of the apparatus to which the operation has been inputted are configured to tone down their screen brightness and prohibit the user input of the operation as is the case in the first embodiment.

When multiple mobile communication terminals 2 are connected to the onboard apparatus 3, the onboard apparatus 3 manages the state of connection between the onboard apparatus 3 and each terminal. Because of this, each mobile communication terminal 2 needs not to manage the state of connection between the mobile communication terminals 2. For example, if multiple mobile communication terminals 2 are carried into the vehicle, each mobile communication terminal 2 needs to communicate with only the onboard apparatus 3.

This simplifies the configuration of the mobile communication terminals 2 and avoids complicating the control programs involved.

Other Embodiments

Embodiments are no limited to the above embodiments. Other embodiments will be described.

In the above-described embodiments, the mobile communication terminal 2 is illustrated as a smartphone (SP). Alternatively, the mobile communication terminal 2 may be a so-called mobile phone.

In the above embodiments, the mobile communication terminal 2 and the onboard apparatus 3 are connected by BT communication. Alternatively, the mobile communication terminal 2 and the onboard apparatus 3 may be connected by USB. That is, the USB module 7 of the mobile communication terminal 2 and the USB module 17 of the onboard apparatus 3 can correspond to the notification means (device). The notification means may establish the connection using only USB or using both BT and USB.

Types of content and screen displays described in conjunction with each of the above embodiments are merely examples. Thus, the operation source icon 41 may be replaced with a displayed message such as "Smartphone is now operating." Any type of display or indication is acceptable as long as it allows the user to recognize which apparatus is presently operating on the content.

In the above embodiments, the content is acquired via the communication network 100. However, this does not limit embodiments. For example, the content acquired by the mobile communication terminal 2 may not be the content acquired via the communication network 100. The content stored in the mobile communication terminal 2 may be used. The onboard apparatus 3 may acquire the content via the communication network 100 and records the acquired content in the storage part 18. The content stored in the storage part 18 of the onboard apparatus 3 may be the content that is operable from both of the mobile communication terminal 2 and the onboard apparatus 3.

In the above examples, the content is received by the telephone communication part 5 over the communication network 100. In an alternative configuration, the content may be acquired over a so-called wireless LAN or WiMAX (Worldwide Interoperability for Microwave Access).

In the above examples, the display apparatus is installed in the vehicle. Alternatively, the display apparatus may be a home-use TV set or a piece of equipment with a display function such as a personal computer. As another alternative, the display apparatus is not limited to usage in the vehicle compartment as in the case of a navigation apparatus, the display apparatus may be one which is mounted to an external of the vehicle.

In the above examples, the display on the display parts 9 and 21 is changed in accordance with the input information notified within the predetermined time period. Alternatively, if the input information is notified multiple times during a predetermined change wait period, the screen may be changed in accordance with only the most-recently notified input information within the predetermined change wait period. Because of this, after the operations are finished (i.e., finalized) in the operated apparatus, the display is changed. As a result, an unnecessary change in screen is minimized, and the driver's gaze on the display part 9 or 21 is minimized.

In the above examples, the navigation apparatus is illustrated as the onboard apparatus 3 serving as the display apparatus. However, this does not limit embodiments. For example, the display apparatus may be such an apparatus that enables use of the navigation function in response the start of a navigation application program stored in its storage part 18.

In the drawings and embodiments, the reference numeral 1 refers to the display system. The reference numeral 2 refers to the mobile communication terminal. The reference numeral 3 refers to the onboard apparatus, which is an example of display apparatus and an example of onboard display apparatus. The reference numeral 4 refers to the terminal-side control part, which is an example of content execution device and means. The reference numeral 6 refers to the BT module, which is an example of notification device and means, and an example of acquisition means and device. The reference numeral 7 refers to the USB module, which is an example of notification device and means, and an example of acquisition means and device. The reference numeral 9 refers to the display part, which is an example of display means and device. The reference numeral 10 refers to the key input part, which is an example of operation input device and means. The reference numeral 15 refers to the apparatus-side control part 15, which is an example of content execution device and means. The reference numeral 16 refers to the BT module 16, which is an example of notification device and means, and an example of acquisition means and device. The reference numeral 17 refers to the USB module, which is an example of notification device and means, and an example of acquisition means and device. The reference numeral 21 refers to the display part, which is an example of display device and means. The reference numeral 23 refers to the operation switch, which is an example of operation input device and means. The reference numeral 50 refers to the display system.

The present disclosure has various aspects.

According to a first aspect, there is provided a display apparatus that is capable of executing content of a mobile communication terminal in cooperation with the mobile communication terminal when the display apparatus is communicably connected to the mobile communication terminal. The communication terminal is also capable of executing the content of the mobile communication terminal. The display apparatus comprises: an operation input device for inputting an operation on the content in the display apparatus; an acquisition device for acquiring input information, which indicates that the operation on the content has been inputted in the mobile communication terminal, from the mobile communication terminal; and a display device for showing that the operation on the content has been inputted in the mobile communication terminal when the acquisition device acquires the input information from the mobile communication terminal.

According to the above display apparatus, in response to the input of the operation on the content in the mobile communication terminal, the display apparatus indicates that the operation has been inputted in the mobile communication terminal. The display apparatus thus allows its user to recognize that the operation has been inputted in the mobile communication terminal. Usability improves. In this context, the operation on the content refers not only to the operation to execute the content but also to various operations preparatory to executing the content such as those for acquiring the content and those for starting an application program that execute the content.

The above display apparatus may further comprises: a notification device for notifying the mobile communication terminal that the operation on the content is inputted in the display apparatus, when the operation on the content is inputted in the operation input device of the display apparatus. This feature of the display apparatus can inform the mobile communication terminal that the operation has been inputted in the display apparatus. This allows the user of the mobile communication terminal to recognize that the operation has been inputted in the display apparatus.

The above display apparatus may be configured as follows. The display device of the display apparatus makes brightness of the display device of the display apparatus lower than that of a display device of the mobile communication terminal, thereby showing that the operation on the content has been inputted in the mobile communication terminal. According to this configuration, by viewing the display device, the user of the display apparatus can readily recognize that the operation has been inputted in the mobile communication terminal.

The above display apparatus may be configured as follows. The display device of the display apparatus highlights a portion of a display screen of the display device of the display apparatus relative to the other portion of the display screen of the display device of the display apparatus so that the highlighted portion corresponds to the operation on the content notified to the acquisition device, thereby showing that the operation on the content has been inputted in the mobile communication terminal. This feature of the display apparatus can allow its user to further recognize what kind of the operation on the content has been inputted in the mobile communication terminal.

The above display apparatus may be configured as follows. When the acquisition device acquires the input information from the mobile communication terminal, an input of the operation on the content with use of the operation input device of the display apparatus is inhibited during a predetermined time period. According to this configuration, for example, if the user of the display apparatus inputs the operation to stop the content while the user of the mobile communication terminal inputs an operation to execute the content, the operation input earlier than the other takes priority. This feature of the display apparatus prevents the content from getting changed in an inordinately short time period, thereby providing the responsiveness and operability matching user's feeling.

The above display apparatus may be configured as follows. When the acquisition device acquires the input information from the mobile communication terminal, the display apparatus changes display thereof in a manner reflecting the operation on the content indicated by the acquired input information. This feature of the display apparatus allows its user to recognize not only that the operation has been inputted in the mobile communication terminal but also that what kind of operation is being carried out on the mobile communication terminal.

The above display apparatus may be configured as follows. When the acquisition device acquires the input information from the mobile communication terminal multiple times during a predetermined change wait period, the display apparatus changes display thereof in a manner reflecting the operation on the content that is indicated by the most-recently-acquired input information within the predetermined change wait period. This feature of the display apparatus changes its display after the operation in the mobile communication terminal is finished, i.e., after the operations on the terminal is finalized. This can minimize an unnecessary change in the display.

The above display apparatus may be configured as follows. The mobile communication terminal is a plurality of mobile communication terminals. The display apparatus is communicably connectable to is the plurality of mobile communication terminals. When the acquisition device is notified that that the operation on the content has been inputted in one of the mobile communication terminals, the communication device notifies the rest of the mobile communication terminals that the operation on the content has been inputted in the one of the mobile communication terminal. When each of the rest of the mobile terminals is notified by the display apparatus that the operation on the content has been inputted in the one of the mobile communication terminal, a display device of the each of the rest of the mobile communication terminal shows, in a recognizable manner, that the operation on the content has been inputted in the one of the mobile communication terminals. According to this configuration, even when multiple mobile communication terminals are connected to the display apparatus, the display apparatus allows its user to recognize which terminal has been used to input the operation.

The above display apparatus may be configured as follows. Each of the display apparatus and the mobile communication terminal includes a content execution device for executing the content. When the operation on the content is inputted in either one of the display apparatus and the mobile communication terminal in a state where the mobile communication terminal and the display apparatus are connected to each other, the content execution device of the display apparatus executes the content regardless of which one of the display apparatus and the mobile communication terminal has been used to input the operation on the content. This feature of the display apparatus enables the mobile communication terminal to operate longer (e.g., by saving power of the battery). Usability improves.

The above display apparatus may be an onboard display apparatus. According to this configuration, since the display apparatus is the onboard display apparatus, it becomes possible to utilize a larger screen and a higher level of sound quality of the display apparatus in stead of those of the mobile communication terminal. Therefore, an environment to execute the content improves and a user can utilize the content comfortably.

According to a second aspect of the present disclosure, there is provided a mobile communication terminal that is capable of executing content of the mobile communication terminal in cooperation with a display apparatus when the mobile communication terminal is communicably connected to the display apparatus. The display apparatus is also capable of executing the content of the mobile communication terminal. The mobile communication terminal comprises: an operation input device for inputting an operation on the content in the mobile communication terminal; an acquisition device for acquiring input information, which indicates that the operation on the content has been inputted in the display apparatus, from the display apparatus; and a display device for showing that the operation on the content has been inputted in the display apparatus when the acquisition device acquires the input information from the display apparatus. This mobile communication terminal allows its user to recognize that the operation on the content has been input in the display apparatus. Usability improves.

The above mobile communication terminal may further comprises a notification device for notifying the display apparatus that the operation on the content is inputted in the mobile communication terminal, when the operation on the content is inputted in the operation input device of the mobile communication terminal. Because of this, a user of the display apparatus can recognize that the operation on the content is inputted in the mobile communication terminal.

According to a third aspect of the present disclosure, there is provided a display system comprising a mobile communication terminal and a display apparatus communicably connectable to each other. Each of the mobile communication terminal and the display apparatus comprises an operation input device, a notification device and a display device. The operation input device of the display apparatus is provided to input an operation on content in the display apparatus. The operation input device of the mobile communication terminal is provided to input the operation on the content in the mobile communication terminal. By acquiring input information from the mobile communication terminal, the acquisition device of the display apparatus is notified that the operation on the content has been inputted in the mobile communication terminal. When the acquisition device of the display apparatus is notified that the operation on the content has been inputted in the mobile communication terminal, the display device of the display apparatus shows that the operation on the content has been inputted in the mobile communication terminal. By acquiring the input information from the display apparatus, the acquisition device of the mobile communication terminal is notified that the operation on the content has been inputted in the display apparatus. When the acquisition device of the mobile communication terminal is notified that the operation on the content has been inputted in the display apparatus, the display device of the mobile communication terminal shows that the operation on the content has been inputted in the display apparatus.

According to this display system, it becomes possible to input the operation on the content by using both of the mobile communication terminal and the display apparatus. Even when the display devices of the mobile communication terminal and the display apparatus display substantially the same operation screen or the operation screens of substantially the same details, the display part of one of the display apparatus and the mobile communication terminal can indicate that the operation is has been inputted in the other of the display apparatus and the mobile communication terminal. This allows the users of both the display apparatus and the mobile communication terminal to recognize in which of the display apparatus and the mobile communication terminal the operation on the content has been inputted. Usability improves.

The above display system may be configured as follows. Each of the mobile communication terminal and the display apparatus further comprises a content execution device for executing the content. When the operation on the content is inputted in either one of the mobile communication terminal and the display apparatus in a state where the mobile communication terminal and the display apparatus are connected to each other, the content execution device of the display apparatus executes the content regardless of which one of the operation input devices of the mobile communication terminal and the display apparatus is used to input the operation on the content. This feature of the display system can reduce power consumption of the mobile communication terminal, which is typically driven by battery power.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display apparatus capable of executing content of a mobile communication terminal in cooperation with the mobile communication terminal when the display apparatus is communicably connected to the mobile communication terminal, wherein the communication terminal is also capable of executing the content of the mobile communication terminal, the display apparatus comprising:
   an operation input device for inputting an operation on the content in the display apparatus;
   an acquisition device for acquiring input information, which indicates that the operation on the content has been inputted in the mobile communication terminal, from the mobile communication terminal; and
   a display device for showing that the operation on the content has been inputted in the mobile communication terminal when the acquisition device acquires the input information from the mobile communication terminal; wherein
   when the acquisition device acquires the input information from the mobile communication terminal multiple times during a predetermined change wait period, the display apparatus changes display thereof in a manner reflecting the operation on the content that is indicated by the most-recently-acquired input information within the predetermined change wait period.

2. The display apparatus according to claim 1, further comprising:
   a notification device for notifying the mobile communication terminal that the operation on the content is inputted in the display apparatus, when the operation on the content is inputted in the operation input device of the display apparatus.

3. The display apparatus according to claim 1, wherein:
   the display device of the display apparatus makes brightness of the display device of the display apparatus lower than that of a display device of the mobile communication terminal, thereby showing that the operation on the content has been inputted in the mobile communication terminal.

4. The display apparatus according to claim 1, wherein:
   the display device of the display apparatus highlights a portion of a display screen of the display device of the display apparatus relative to the other portion of the display screen of the display device of the display apparatus so that the highlighted portion corresponds to the operation on the content notified to the acquisition device, thereby showing that the operation on the content has been inputted in the mobile communication terminal.

5. The display apparatus according to claim 1, wherein:
   when the acquisition device acquires the input information from the mobile communication terminal, an input of the operation on the content with use of the operation input device of the display apparatus is inhibited during a predetermined time period.

6. The display apparatus according to claim 1, wherein:
   when the acquisition device acquires the input information from the mobile communication terminal, the display apparatus changes display thereof in a manner reflecting the operation on the content indicated by the acquired input information.

7. The display apparatus according to claim 1, wherein the display apparatus is an onboard display apparatus.

8. A display apparatus capable of executing content of a mobile communication terminal in cooperation with the mobile communication terminal when the display apparatus is communicably connected to the mobile communication terminal, wherein the communication terminal is also capable of executing the content of the mobile communication terminal, the display apparatus comprising:

an operation input device for inputting an operation on the content in the display apparatus;

an acquisition device for acquiring input information, which indicates that the operation on the content has been inputted in the mobile communication terminal, from the mobile communication terminal; and a display device for showing that the operation on the content has been inputted in the mobile communication terminal when the acquisition device acquires the input information from the mobile communication terminal; wherein the mobile communication terminal is a plurality of mobile communication terminals;

the display apparatus is communicably connectable to the plurality of mobile communication terminals;

when the acquisition device is notified that the operation on the content has been inputted in one of the mobile communication terminals, the communication device notifies the rest of the mobile communication terminals that the operation on the content has been inputted in the one of the mobile communication terminals; and when each of the rest of the mobile terminals is notified by the display apparatus that the operation on the content has been inputted in the one of the mobile communication terminals, a display device of the each of the rest of the mobile communication terminals shows, in a recognizable manner, that the operation on the content has been inputted in the one of the mobile communication terminals.

9. A display apparatus capable of executing content of a mobile communication terminal in cooperation with the mobile communication terminal when the display apparatus is communicably connected to the mobile communication terminal, wherein the communication terminal is also capable of executing the content of the mobile communication terminal, the display apparatus comprising:

an operation input device for inputting an operation on the content in the display apparatus;

an acquisition device for acquiring input information, which indicates that the operation on the content has been inputted in the mobile communication terminal, from the mobile communication terminal; and a display device for showing that the operation on the content has been inputted in the mobile communication terminal when the acquisition device acquires the input information from the mobile communication terminal; wherein each of the display apparatus and the mobile communication terminal includes a content execution device for executing the content;

when the operation on the content is inputted in either one of the display apparatus and the mobile communication terminal in a state where the mobile communication terminal and the display apparatus are connected to each other, the content execution device of the display apparatus executes the content regardless of which one of the display apparatus and the mobile communication terminal has been used to input the operation on the content.

10. A mobile communication terminal capable of executing content of the mobile communication terminal in cooperation with a display apparatus when the mobile communication terminal is communicably connected to the display apparatus, wherein the display apparatus is also capable of executing the content of the mobile communication terminal, the mobile communication terminal comprising:

an operation input device for inputting an operation on the content in the mobile communication terminal;

an acquisition device for acquiring input information, which indicates that the operation on the content has been inputted in the display apparatus, from the display apparatus; and a display device for showing that the operation on the content has been inputted in the display apparatus when the acquisition device acquires the input information from the display apparatus; wherein when the acquisition device acquires the input information from the display apparatus multiple times during a predetermined change wait period, the mobile communication terminal changes display thereof in a manner reflecting the operation on the content that is indicated by the most-recently-acquired input information within the predetermined change wait period.

11. The mobile communication terminal according to claim 10, further comprising:

a notification device for notifying the display apparatus that the operation on the content is inputted in the mobile communication terminal, when the operation on the content is inputted in the operation input device of the mobile communication terminal.

12. A display system comprising:

a mobile communication terminal and a display apparatus communicably connectable to each other, wherein:

each of the mobile communication terminal and the display apparatus comprises an operation input device, an acquisition device, and a display device;

the operation input device of the display apparatus is provided to input an operation on content in the display apparatus;

the operation input device of the mobile communication terminal is provided to input the operation on the content in the mobile communication terminal;

by acquiring input information from the mobile communication terminal, the acquisition device of the display apparatus is notified that the operation on the content has been inputted in the mobile communication terminal;

when the acquisition device of the display apparatus is notified that the operation on the content has been inputted in the mobile communication terminal, the display device of the display apparatus shows that the operation on the content has been inputted in the mobile communication terminal;

by acquiring the input information from the display apparatus, the acquisition device of the mobile communication terminal is notified that the operation on the content has been inputted in the display apparatus;

when the acquisition device of the mobile communication terminal is notified that the operation on the content has been inputted in the display apparatus, the display device of the mobile communication terminal shows that the operation on the content has been inputted in the display apparatus; and when the acquisition device of the display apparatus acquires the input information, which indicates that the operation on the content has been inputted in the mobile communication terminal, from the mobile communication terminal multiple times during a predetermined change wait period, the display device of the display apparatus changes display thereof in a manner reflecting the operation on the content that is indicated by the most-recently-acquired input information within the predetermined change wait period.

13. The display system according to claim 12, wherein:
each of the mobile communication terminal and the display apparatus further comprises a content execution device for executing the content; and
when the operation on the content is inputted in either one of the mobile communication terminal and the display apparatus in a state where the mobile communication terminal and the display apparatus are connected to each other, the content execution device of the display apparatus executes the content regardless of which one of the operation input devices of the mobile communication terminal and the display apparatus is used to input the operation on the content.

* * * * *